United States Patent
Miyasaka et al.

(10) Patent No.: US 8,917,267 B2
(45) Date of Patent: Dec. 23, 2014

(54) DISPLAY DEVICE AND DISPLAY METHOD

(75) Inventors: Daigo Miyasaka, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 12/521,023

(22) PCT Filed: Dec. 19, 2007

(86) PCT No.: PCT/JP2007/074460
§ 371 (c)(1),
(2), (4) Date: Sep. 14, 2009

(87) PCT Pub. No.: WO2008/078630
PCT Pub. Date: Jul. 3, 2008

(65) Prior Publication Data
US 2010/0097409 A1    Apr. 22, 2010

(30) Foreign Application Priority Data

Dec. 26, 2006  (JP) ................. 2006-350245

(51) Int. Cl.
*G09G 5/10* (2006.01)
*G09G 3/36* (2006.01)
*G02F 1/133* (2006.01)
*G09F 9/00* (2006.01)
*G02F 1/13* (2006.01)
*H04N 13/04* (2006.01)

(52) U.S. Cl.
CPC ............. *G02F 1/1323* (2013.01); *G09G 3/3648* (2013.01); *H04N 13/0438* (2013.01); *G09G 2320/068* (2013.01); *G09G 2310/08* (2013.01); *H04N 2013/0463* (2013.01)
USPC ........... 345/214; 345/204; 345/619; 345/629; 345/690

(58) Field of Classification Search
CPC .................. G09G 2320/028; G09G 2320/068; G02F 1/1323
USPC .......... 345/690, 214, 204, 619, 629; 380/204, 380/207
See application file for complete search history.

(56) References Cited

U.S. PATENT DOCUMENTS

| 5,877,829 A * | 3/1999 | Okamoto et al. ............... 349/74 |
| 6,529,209 B1 * | 3/2003 | Dunn et al. .................... 345/629 |
| 2003/0095223 A1 * | 5/2003 | Song ............................. 349/141 |

FOREIGN PATENT DOCUMENTS

| JP | 63-312788 | * 12/1988 |
| JP | 1988312788 A | 12/1988 |

(Continued)

OTHER PUBLICATIONS

Morihiro, Yoshiteru, translation of JP-63-312788, FLS Inc.*

(Continued)

*Primary Examiner* — Quan-Zhen Wang
*Assistant Examiner* — Xuemei Zheng
(74) *Attorney, Agent, or Firm* — Sughrue Mion, PLLC

(57) ABSTRACT

A display device is provided with a display section; a drive section driving the display section; and a light shutter control section controlling a light shutter. The display section is configured to display first and second images on the display section during a specific period. The drive section is configured to allow perceiving an image only from a direction in a specific viewing angle range at least during the specific period. The light shutter control section controls the light shutter so that the light shutter is placed into a transmitting state allowing transmitting light during a period during which the first image is displayed in the specific period and placed into a shielding state shielding light during a remaining period in the specific period. The first and second images are generated so that an image generated by adding brightnesses of respective pixels of the first and second images has no correlation to the first image.

16 Claims, 12 Drawing Sheets

(56) References Cited

FOREIGN PATENT DOCUMENTS

| | | |
|---|---|---|
| JP | 1994186506 A | 7/1994 |
| JP | 1999024580 A | 1/1999 |
| JP | 2001255844 A | 9/2001 |
| JP | 2004054043 A | 2/2004 |
| JP | 2005010291 A | 1/2005 |
| JP | 2006140126 A | 6/2006 |

OTHER PUBLICATIONS

International Search Report for PCT/JP2007/074460, dated Jan. 22, 2008.

* cited by examiner

DISPLAY DEVICE AND DISPLAY METHOD

TECHNICAL FIELD

The present invention relates to a display device, and more particularly, to a display device configured to display a display image only to a specific user.

BACKGROUND ART

Flat panel displays, including a liquid crystal display and a plasma display, are applied to a wide range from mobile devices such as cellular phones to large sized devices such as public display devices. Many of such displays have been developed with focusing on the wider viewing angle, the higher brightness, the higher image quality, and the like, and a device has been desired which provides a clear and easy-to-view display as viewed from any angle.

On the other hand, some of the contents displayed on the display are not desired to be viewed by others, such as confidential information and private data. Now that the development of a ubiquitous information society accompanied by the development of information equipment is progressing, an important issue is that display contents are prevented from being viewed by others, even in public circumstances where unspecified people are present. In addition, confidential information not desired to be viewed by a person passing behind a seat may be handled even in an office.

Some cellular phones and the like are provided with a display that enables display contents to be viewed from only a specific direction by providing an optical shield plate (or a louver). As an improvement of this technique, as disclosed in Japanese Laid Open Patent Application No. JP-A 2006-140126, a technique is known in which a viewing angle of a liquid crystal display device is increased for a case where information to be displayed is viewed with being shared with others, whereas the viewing angle of the liquid crystal display device is decreased in the situation where the information to be displayed is not desired to be peeped by others. In the technique disclosed in Japanese Laid Open Patent Application No. JP-A 2006-140126, a louver and a transparency/scattering switching element are provided between a liquid crystal display panel and a backlight, and the louver and transparency/scattering switching element are used to switch a variable width of a viewing angle. As the transparency/scattering switching element, a PDLC (Polymer Dispersed Liquid Crystal) cell is used. Based on such a configuration, the viewing angle is decreased when the viewing angle is to be narrowed, and thereby security protection is improved.

Such techniques are, however, insufficient from the perspective of security protection, because a display can be viewed from right behind even if the viewing angle is decreased.

An image display device for solving such a problem is disclosed in Japanese Laid Open Patent Application No. JP-A Showa 63-312788. The known image display device is configured such that, when a viewer wears glasses having a picture selection function, only the person wearing the glasses is thereby allowed to recognize a secret image, whereas the others are allowed to recognize a public image.

FIG. 13 is a block diagram illustrating a configuration of the disclosed image display device. In the image display device of FIG. 13, picture data are stored in an image data storage memory 12, which has a capacity corresponding to one frame, by using an input image signal 11 under control of a frame signal 13. The image data are read twice from the image data storage memory 12 at the rate of twice of the frame frequency. The image data initially read are fed to a composing circuit 15 as a first image signal 14 compressed to ½, and the image signal subsequently read is inputted to the composing circuit 15 as a second image signal 17 with the chromaticity and brightness thereof have been converted by a chromaticity/brightness conversion circuit 16. Accordingly, the first and second image signals 14 and 17 are alternately displayed on an image display unit 18. On the other hand, shutters of the glasses 21 are driven in response to the frame signal 13 by a glass shutter timing generator circuit 19. The shutters of the glasses 21 are driven such that the image corresponding to the second image signal 17 is not viewed by the viewer. Such a configuration and an operation allows a person not wearing the spectacles to view a gray image that is a composite image of the first and second image signals 14 and 17, and not related to the first image signal, or the third image (public image), whereas the person wearing the glasses can view a desired image (secret image) corresponding to the first image signal.

Another technique for solving the above-described problem is disclosed in Japanese Laid Open Patent Application No. JP-A 2001-255844. The technique disclosed in this patent application is directed to allow only an "image-permitted" user (observer) to perceive a private image (a secret image) on the display, and a non-permitted user to simply view a random pattern, an unreadable image, or maybe a screen saver image (a public image). For this purpose, an image processing technique involving a data shielding pattern and alternating pattern is combined with a wearable device such as active glasses, which is synchronized with a display incorporating an image created by an image processing technology. According to such a technique, data can be displayed only in private on a display a public can view, on the basis of a well-known human visual capability that fuses a dissimilar image with a single image.

The inventions disclosed in the above-mentioned Japanese Laid Open Patent Publication Nos. JP-A showa 63-312788 and JP-A 2001-255844, however, suffers from a problem that, in most of liquid crystal display devices, the secret image is observed even without wearing glasses depending on the angle at which a display screen is observed.

This results from a problem that a liquid crystal display exhibits viewing angle characteristics, the gamma characteristics vary depending on the angle at which the screen is observed. In the case where the gamma characteristics vary depending on the viewing angle, the secret image is not shielded even when the brightness values of the image for shielding the secret image (hereinafter referred to as a reversed image) are set to achieve the shielding of the secret image with respect to the front direction, since the brightness values of the reversed image are different at a different observation angle.

Also, the secret image is desired to be viewable only for a specific person and shielded from the others, and therefore it is desirable to prevent as much as possible the secret image from being displayed in a direction other than that in which the specific person browses; this is not limited to the liquid crystal display device.

DISCLOSURE OF INVENTION

Accordingly, an object of the present invention as a whole is to provide a display device capable of more robustly retaining a secret image. More specifically, one object of the present invention is to provide a liquid crystal display device capable of preventing a person not wearing glasses from observing a secret image, independently of a viewing angle characteristic of the liquid crystal display device.

In one aspect of the present invention, a display device includes: a display section; a drive section for driving the display part; and a light shutter control section for controlling a light shutter. The drive section is configured to display a first image and a second image on the display section during a specific period. The display section is configured such that an image can be viewed only from a direction within a specific viewing angle range at least during the specific period. The light shutter control section controls the light shutter such that, in the specific period, the light shutter is placed into a transmission state allowing transmitting light during a period during which the first image is displayed, whereas the light shutter is placed into a light shielding state shielding the light during the rest of the specific period. The first and second images are generated such that an image obtained by adding brightness values of pixels of each image exhibits no correlation to the first image.

The present invention provides a display device which can observe secrecy of a secret image more robustly. In particular, one exemplary embodiment of the present invention provides a liquid crystal display device which allows only a specific person to observe a secret image independently of the viewing angle characteristics of the liquid crystal display device.

BEST MODE FOR CARRYING OUT THE INVENTION

First Exemplary Embodiment

Figure 1:
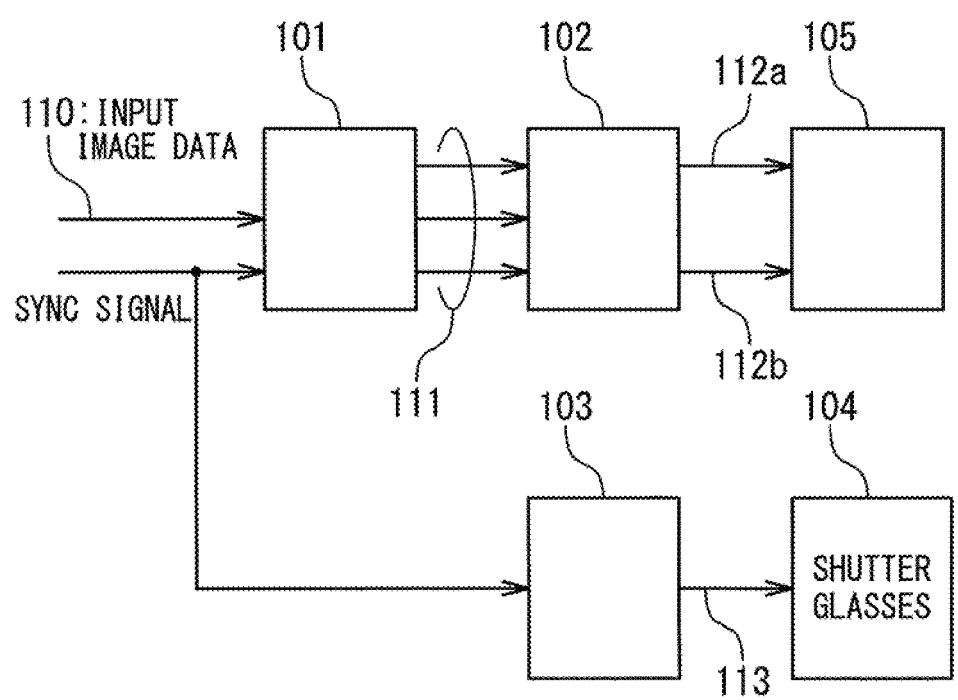
FIG. 1 is a block diagram illustrating a configuration of a liquid crystal display device in a first exemplary embodiment of the present invention.

FIG. 1 is a block diagram illustrating a configuration of a liquid crystal display device in a first exemplary embodiment. The liquid crystal display device in FIG. 1 includes a memory 101, a display controller 102, a shutter glass control signal generator circuit 103, shutter glasses 104, and a liquid crystal display section 105.

The memory 101 externally receives in turn input image data 110 incorporating secret images, reversed images, and public images to temporarily store them. It should be noted that the secret images are images to be recognized only by a specific user (i.e., a person wearing shutter glasses 104), and the reversed images are images used to shield the secret images. The public images are images to be recognized by a person other than the specific user. The memory 101 is synchronized with a synchronization signal to output stored image data 111 incorporating the secret images, the reversed images, and the public images to the display controller 102.

The display controller 102 is responsive to the image data 111 for generating a video signal 112a and a controller signal 112b for controlling and driving the liquid crystal display section 105.

The shutter glass control signal generator circuit 103 is synchronized with the synchronization signal to generate a shutter control signal 113 for switching the state of a shutter of the shutter glasses 104. In response to the shutter control signal 113, the shutter of the shutter glasses 104 is placed into a transmission state where light is transmitted, or a light shielding state where light is shielded.

Figure 2:
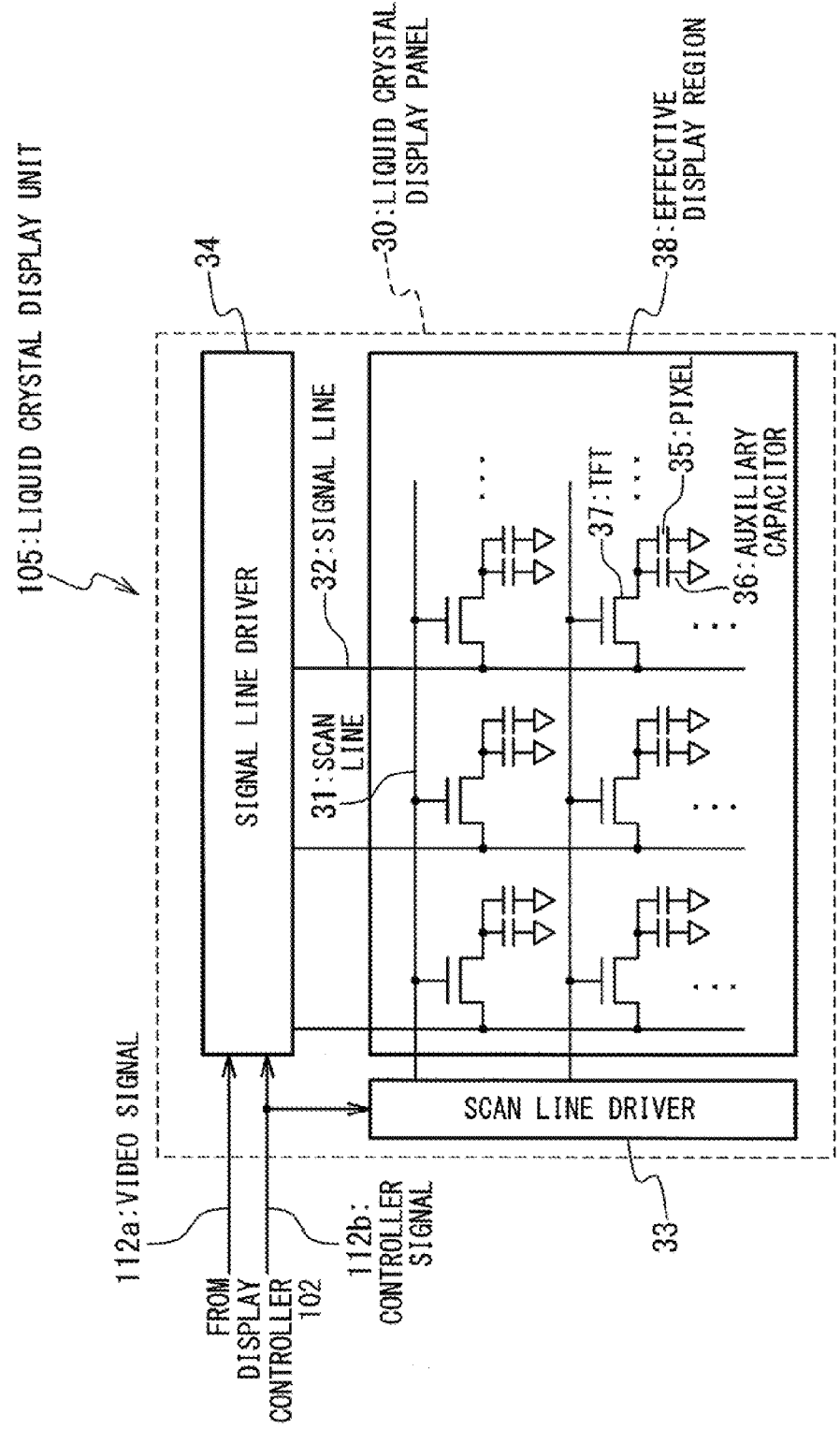
FIG. 2 is a diagram illustrating a configuration of a liquid crystal display section in the first exemplary embodiment.

FIG. 2 illustrates a configuration of the liquid crystal display section 105. The liquid crystal display section 105 includes: a liquid crystal display panel 30 provided with multiple scan lines 31 and signal lines 32 intersecting with each other; a scan line driver 33 for scanning and driving the scan lines 31; and a signal line driver 34 for driving the signal lines 32. In an effective display region 38 of the liquid crystal display panel 30, pixels 35 are provided at intersections of the scan lines 31 and the signal lines 32. The images are displayed in the effective display region 38 of the liquid crystal display panel 30. The pixels 35 are connected to the signal lines 32 through thin film transistors (TFTs) 37, and further connected with auxiliary capacitors 36 in parallel, respectively. The thin film transistors 37 have a gate connected to the scan line 31, and are turned on or off according to the voltage level of the scan line 31.

Figure 3:
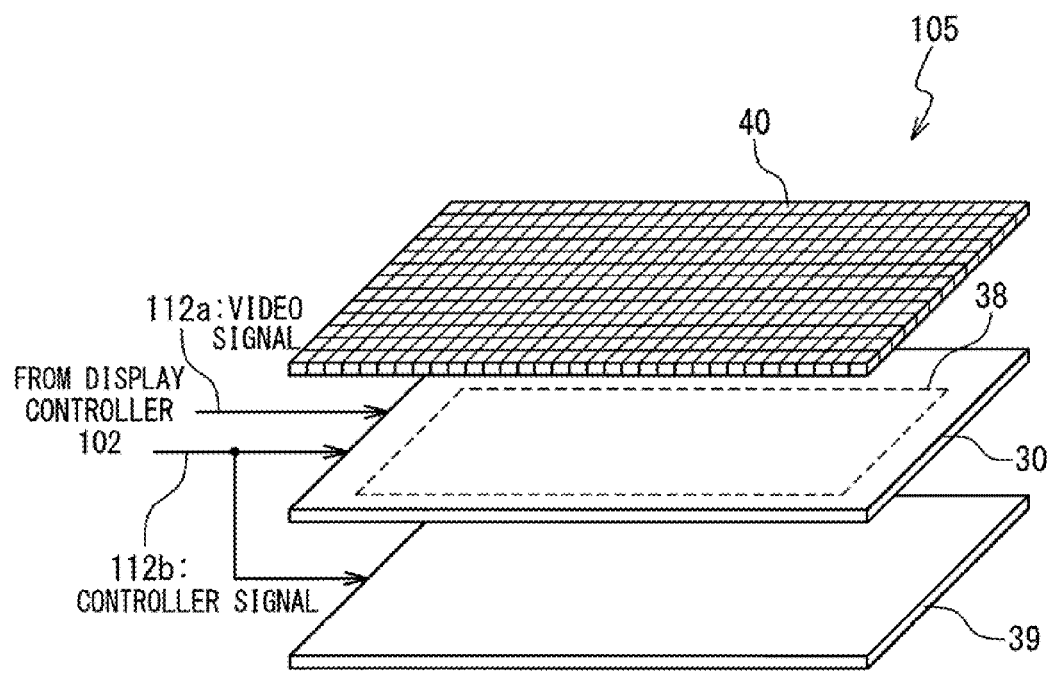
FIG. 3 is a perspective view illustrating the configuration of the liquid crystal display section in the first exemplary embodiment.

FIG. 3 is a diagram illustrating the configuration of the liquid crystal display section 105 as viewed from another angle. In addition to the components illustrated in FIG. 2, the liquid crystal display section 105 at least includes: a backlight 39 positioned on the back surface of the effective display region 38 and irradiates light from the back surface toward the front surface; and an optical louver 40 positioned on the front surface of the effective display region 38. A blinking control of the backlight 39 is performed by the display controller 102, and the controller signal 112b from the display controller 102 is transmitted to the backlight 39.

Figure 6:
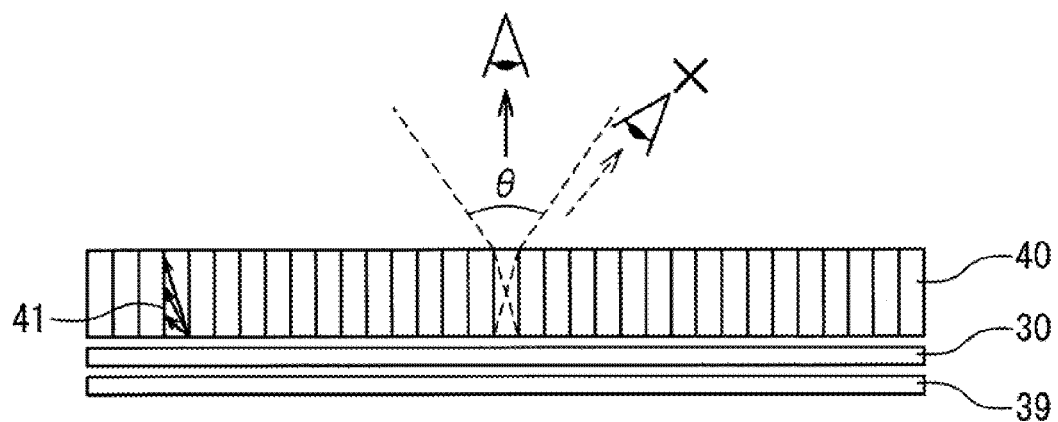
FIG. 6 is a diagram illustrating a configuration example of an optical louver in the first exemplary embodiment.

The optical louver 40 is provided to control the direction of light emitted from the effective display region 38 such that an image displayed in the effective display region 38 can be viewed only within a specific angle range. In the present exemplary embodiment, as illustrated in FIG. 6, the optical louver 40 includes partitions through which the light passes in the direction perpendicular to the liquid crystal display panel 30, and more specifically, is configured such that a plurality of vertically and horizontally extending grid plates 41 are combined in a grid form. The grid plates 41 are applied with black paint, which shields light having large incident angles in the light incident to the optical louver 40. Such a configuration allows a person observing from the specific viewing angle range θ (e.g., from the front) to view a display image in the effective display region 38 of the liquid crystal display panel 30, while a person observing from the outside of the specific viewing angle range cannot view the display image.

Figure 4:
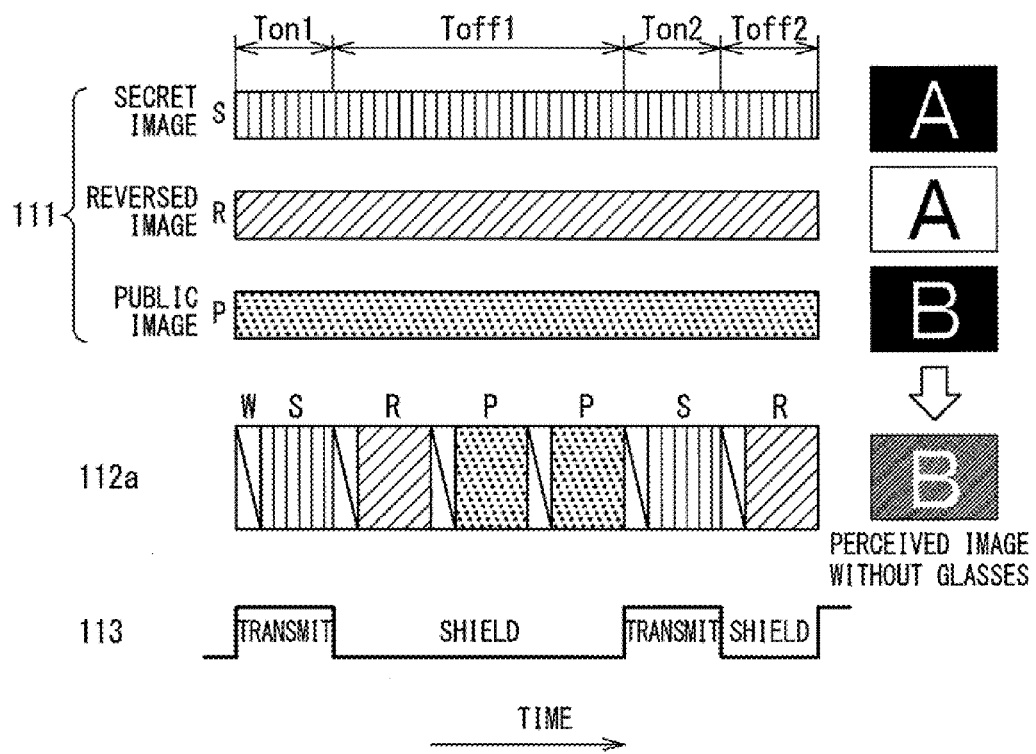
FIG. 4 is a timing chart illustrating one example of the operation of the liquid crystal display device in the first exemplary embodiment.

Subsequently, a description is given of an image display method of the present exemplary embodiment. FIG. 4 is an example of a timing chart of image data 111 outputted from the memory 101, the video signal 112a and the shutter control signal 113 for one frame period. In the operation of FIG. 4, one frame period is divided into six sub-frame periods, and a secret image, a reversed image, and a public image are each displayed during two sub-frame periods. It should be noted that the number of sub-frame periods during which each image is displayed, and the assignment of the sub-frame periods to the images may be arbitrarily determined.

The display controller 102 is fed with a secret image S, a reversed image R, and a public image P as the image data 111. In the present exemplary embodiment, the video signal 112a is generated such that the secret image S is displayed during the periods Ton1 and Ton2, and that the reversed image R and the public image P are displayed during the periods Toff1 and Toff2. As will be described in detail later, the reversed image R is generated such that a composite image obtained by adding brightnesses of the respective pixels of the secret image S and those of the respective corresponding pixels of the reversed image R is an image which exhibits no correlation to the secret image S. This is to prevent a person not wearing the shutter glasses 104 from recognizing the secret image S.

More specifically, in a period Ton1, during a blanking period W immediately after the start thereof, the display controller 102 is set for displaying the secret image S, and the secret image S is displayed in the effective display region 38 of the liquid crystal display panel 30 during a display period subsequent to the blanking period W.

Then, in the period Toff1, during a first blanking period W immediately after the start thereof, the display controller 102 is set for displaying the reversed image R, and during a first display period subsequent to the first blanking period W, the reversed image R is displayed in the effective display region 38 of the liquid crystal display panel 30. Further, during a second blanking period subsequent to the first display period, the display controller 102 is set for displaying the public image P, and during a second display period subsequent to the second blanking period, the public image P is displayed in the effective display region 38.

During periods Ton2 and Toff2, the secret image S and the reversed image R are also respectively displayed on the basis of the same operation. During the display period of the period Ton2, the secret image S is displayed, and during the display period of the period Toff2, the reversed image R is displayed.

The shutter control signal 113 to be transmitted to the shutter glasses 109 is generated such that the shutters of the shutter glasses 104 are placed into the transmission state during the periods Ton 1 and Ton2, and the shutters of the shutter glasses 104 are placed into the light shielding state during the periods Toff1 and Toff2. In this way, the shutter control signal 113 is generated in the shutter glass control signal generator circuit 103 in response to the synchronization signal.

Figure 5:
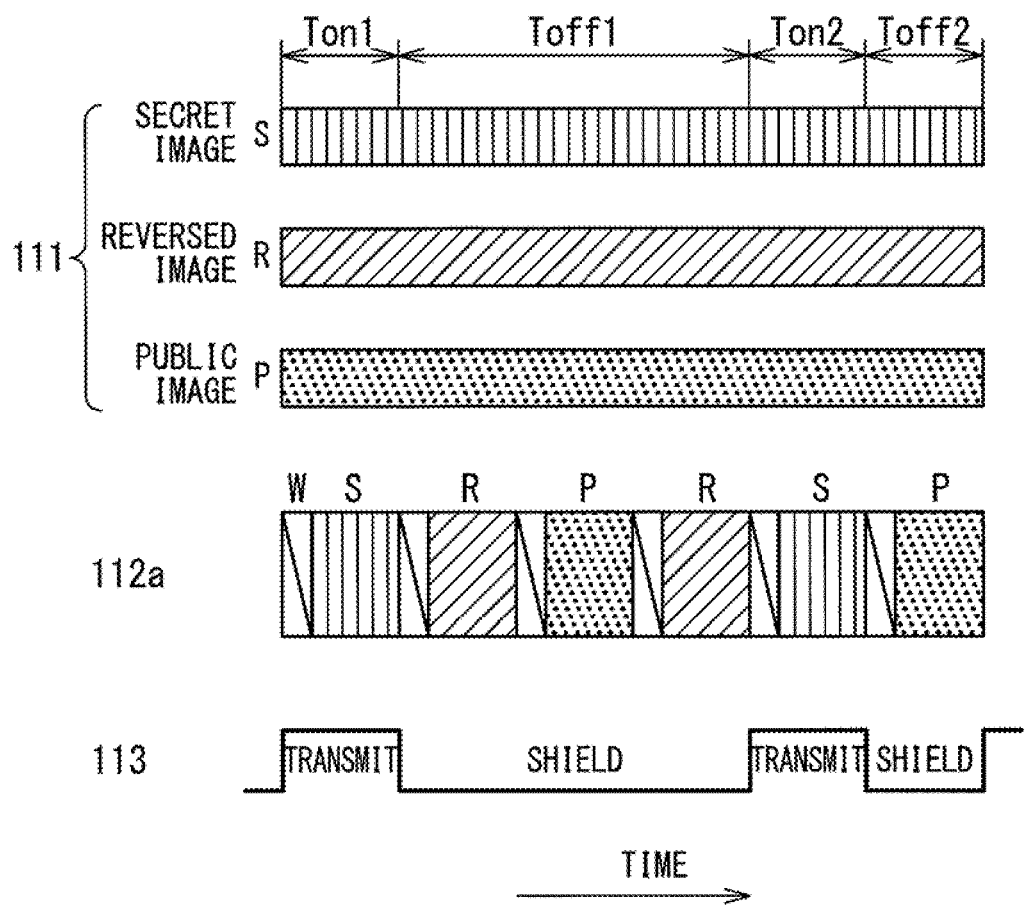
FIG. 5 is a timing chart illustrating another example of the operation of the liquid crystal display device in the first exemplary embodiment.

It should be noted that, in the operation of FIG. 4, the images are displayed in the order of the secret image S, the reversed image R, the public image P, the public image P, the secret image S, and the reversed image R during the one-frame period; however, the order in which the images are displayed is basically arbitrary. As illustrated in FIG. 5, for example, the perceivable images are same for the person wearing the shutter glasses 104 and the person not wearing the shutter glasses 104, even when a period during which the reversed image R are displayed and a period during which the public image P is displayed are replaced by each other. The order of the secret image S, the reversed image R, and the public image P can be arbitrary selected under conditions in which the shutter control signal 113 is generated such that the shutters of the shutter glasses 104 are placed into the transmission state during the display periods for the secret image S.

The important point is a method for generating the reversed image R. In order to prevent the person not wearing the shutter glasses 104 from perceiving the secret image S, the reversed image R is generated such that the composite image obtained by adding the brightnesses of the respective pixels of the secret image S and those of the respective corresponding pixels of the reversed image R is an image which exhibits no correlation to the secret image S. In this case, the reversed image R should be finally obtained as grayscale values, and the generation of the reversed image R should be performed on the basis of gamma characteristics (grayscale level to brightness characteristics) of the liquid crystal display panel 30, since the composition of the secret and reversed images S and R by human vision is performed on the basis of the brightness.

Figure 7:
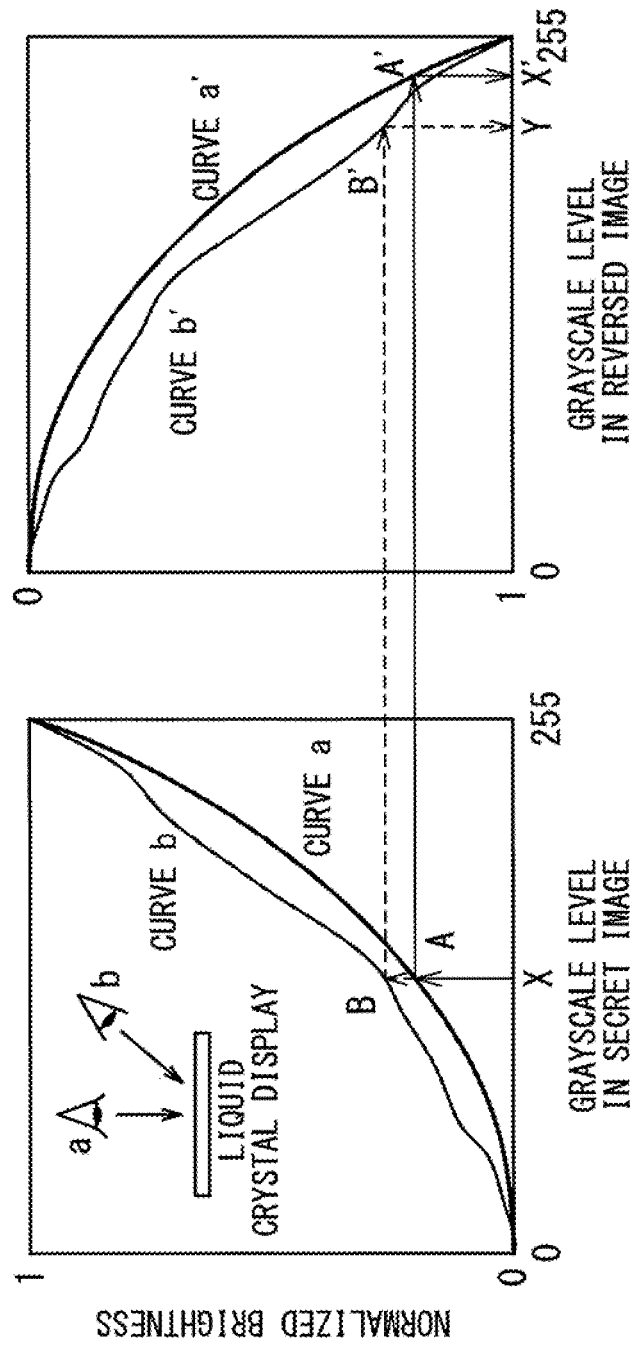
FIG. 7 is a graph illustrating a relationship between the grayscale value and brightness in each of a secret image and a reversed image.

In the following, a description is given of a generation method of the reversed image R which provides shielding of the secret image S as viewed from the front on the liquid crystal display panel 30 having the gamma characteristics, with reference to FIG. 7. The left-hand diagram of FIG. 7 is a graph illustrating the gamma characteristics of the liquid crystal display panel 30, and the right-hand diagram of FIG. 7 is a diagram in which gamma curves in the left-hand diagram are vertically reversed such that normalized brightness 1 corresponds to the intersection with the horizontal axis. The curve a in the left-hand diagram of FIG. 7 represents the gamma characteristics for a case where the liquid crystal display panel 30 is viewed from the front, and the curve a' in the right-hand diagram of FIG. 7 is a curve obtained by vertically reversing the curve a. As will be understood from the following description, the left-hand diagram of FIG. 7 represents the relationship between the grayscale value and brightness of the secret image S, and the right-hand diagram of FIG. 7 represents the relationship between the grayscale value and brightness of the reversed image R.

A most simple method for generating the reversed image R such that the composite image obtained by adding the brightnesses of the respective pixels of the secret image S and the reversed image R is an image which exhibits no correlation to the secret image S is to determine grayscale values of the respective pixels of the reversed image R such that the sum of the brightnesses of the secret image S and the reversed image R is constant for the respective pixels. Referring to the left-hand diagram of FIG. 7, it is assumed that, for example, the grayscale value of a certain pixel of the secret image S is X. In this case, the brightness value of the instant pixel of the secret image S takes the value indicated by the point A. Also, in the right-hand diagram of FIG. 7, it is provided that the intersection of the normalized brightness of the vertical axis with the horizontal axis is one, and the normalized brightness decreases as it is separated from the horizontal axis, and therefore it is only necessary to extend a linear line from the point A parallel to the horizontal axis, and determine the grayscale value X' corresponding to the point A' at which the linear line intersects with the curve a' in the right-hand diagram as the grayscale value of the reversed image R. Such method allows the sum of normalized brightness of the secret image S and normalized brightness of the reversed image R to be constantly one.

The above-described method allows the secret image S to be recognized only by the person wearing the shutter glasses 104, so that the secret image S is not recognized by the person not wearing the shutter glasses 104. The person not wearing the shutter glasses 104 recognizes the public image P.

The above-described method, however, may allow the secret image S to be recognized by the person not wearing the shutter glasses 104 as obliquely viewed, since the liquid crystal display panel 30 exhibits viewing angle characteristics, that is, the gamma characteristics are dependent on the angle at which the screen is observed. The curve b in the left-hand diagram of FIG. 7 represents the gamma characteristics for a case where the liquid crystal display panel 30 is obliquely viewed, and the curve b' in the right-hand diagram of FIG. 7 is a curve obtained by vertically reversing the curve b. Further, the difference in shape between the curves a and b indicates that the brightness value exhibits a larger difference depending on the viewing angle as the corresponding grayscale value is increased from zero, and the brightness difference may reach at most twice or more. The fact that the brightness value of the curve b is larger than that of the curve a, particularly in the middle grayscale range, implies that middle grayscale levels are perceived brighter as a whole as obliquely viewed.

In detail, the brightness value of the secret image S corresponding to the grayscale value X as obliquely viewed takes the value indicated by the point B. If the grayscale value of the reversed image R is obtained in the same manner as described before, the grayscale value of the reversed image R, which meets the requirement that the sum of the brightness of the secret image S and the brightness of the reversed image R is constant as obliquely viewed, takes the grayscale value Y illustrated in the right-hand diagram of FIG. 7, which is largely different from the grayscale value X' of the reversed image R as viewed from the front. The presence of a difference between the grayscale values Y and X' implies that the sum of the brightness of the secret image S and the brightness of the reversed image R varies depending on the viewing angle. That is, the presence of the difference implied that the secret image S can be perceived even by the person not wearing the shutter glasses 104 as obliquely viewed.

For this reason, in order to prevent the secret image from leaking to the person without the shutter glasses 104, it is only necessary: (1) to generate the reversed image R on the basis of the gamma characteristics of the display for the case where the person with the shutter glasses 104 observes the display from a direction within the specific viewing angle range (e.g., from the front), and (2) to prevent the image displayed in the effective display region 38 from being observed from a direction outside the above specific viewing angle range (by all observers) by using the optical louver 104. This avoids the secret image S being observed even if the person not wearing the shutter glasses 104 observes the secret image from the direction within the specific viewing angle range, and also even if the effective display region 38 is observed from the direction outside the specific viewing angle range, avoids the secret image S being observed independently of viewing angle dependency of the liquid crystal display panel 30, because the effective display region 38 is optically shielded by the optical louver 40.

It should be noted that the direction in which the person wearing the shutter glasses 104 is to make the observation is not limited to the front direction. Any direction may be specified as the direction in which the person wearing the shutter glasses 104 is to make the observation, and the optical louver 40 may be configured such that the observation can be made only from the specified direction. In this case, the reversed image R is generated on the basis of the gamma characteristics for the case where the observation is made from the specified direction.

It should be noted that, as illustrated in FIG. 6, the range of the viewing angle θ within which the effective display region 38 can be observed, which range is determined on the basis of the thickness and cell width of the optical louver 40, is desirably set in the angle range within which the variation in the viewing angle characteristics of the liquid crystal display panel 30 is small, and the grayscale level reversal (i.e. the phenomenon in which a grayscale level B which is originally darker than a grayscale level A is more brightly observed than the grayscale level A due to the viewing angle characteristics) does not occur. This is because the possibility that the secret image S is observed even without wearing the shutter glasses 104 is increased when the grayscale level reversal occurs.

It should be noted that the structure of the optical louver 40 is not limited to that described in the present exemplary embodiment, but may be a one-dimensional grid structure extending in any of the vertical or horizontal direction, a structure in which a plurality of one-dimensional grids are stacked with angles thereof being varied, a packing structure f cylindrical cells or a honeycomb structure.

As described above, a liquid crystal display device capable of preventing the person not wearing the shutter glasses from observing the secret image S independently of the viewing angle characteristics of the liquid crystal display panel 30 can be achieved by preventing a display image from being observed from an observation direction different from a direction in which the person wearing the shutter glasses 104 observes the display image.

Second Exemplary Embodiment

Figure 8:
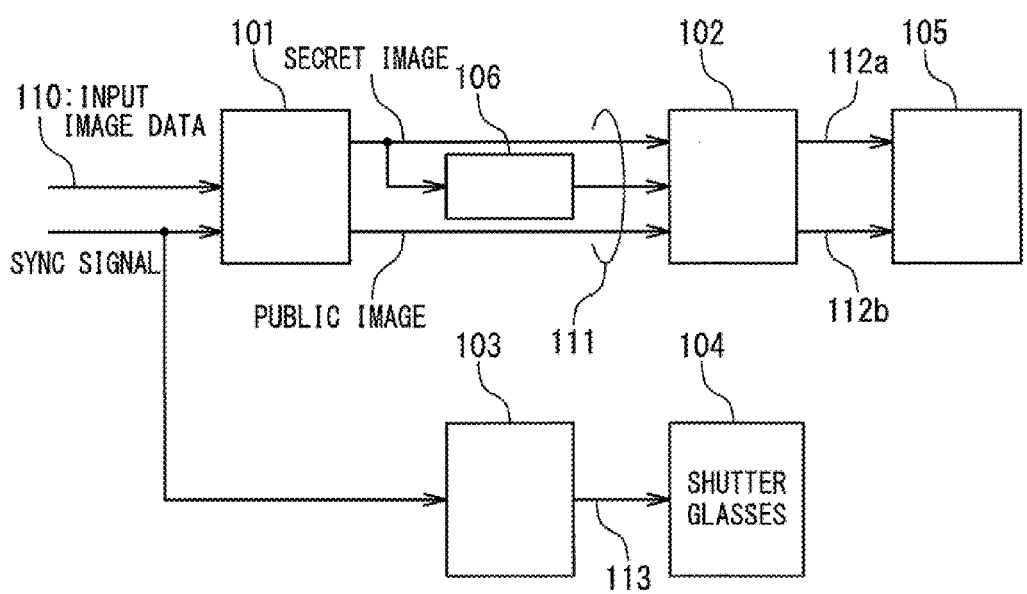
FIG. 8 is a block diagram illustrating a configuration of a liquid crystal display device in a second exemplary embodiment.

FIG. 8 is a block diagram illustrating a configuration of a liquid crystal display device of a second exemplary embodiment. The liquid crystal display device of the second exemplary embodiment has almost the same configuration as that of the liquid crystal display device of the first exemplary embodiment, but is different from that of the first exemplary embodiment in that a reversed image generating circuit 106 is included. The reversed image generating circuit 106 receives a secret image from the memory 101 to output a reversed image.

The reversed image generating circuit 106 determines a grayscale value of each pixel of the reversed image to be a value corresponding to the brightness coincident with the brightness upon display of "white" of the secret image by adding the secret image and the reversed image. This is because vision of an observer perceives integration of the brightness not the grayscale level. If such a reversed image is generated, the reversed image is not required to be stored in the memory 101, and therefore a capacity of the memory 101 can be reduced.

The configuration as thus described allows achieving an effect equivalent to that of the first exemplary embodiment with the image data amount to be stored in the memory 101 being reduced.

Third Exemplary Embodiment

Figure 9:
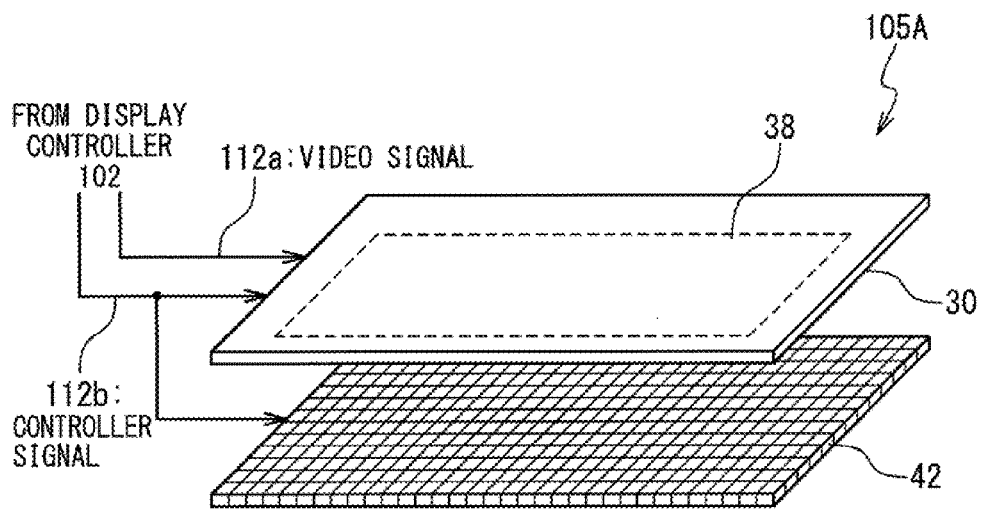
FIG. 9 is a perspective view illustrating a configuration of a liquid crystal display section of a liquid crystal display device in a third exemplary embodiment.

FIG. 9 is a perspective view illustrating the configuration of a liquid crystal display section 105A of a liquid crystal display device in a third exemplary embodiment. A difference between the liquid crystal display section 105A of the liquid crystal display device in the third exemplary embodiment and the liquid crystal display section 105 of the liquid crystal display device in the first exemplary embodiment is that the liquid crystal display panel 30 is not arranged between the backlight 39 and the optical louver 40, but the effective display region 38 of the liquid crystal display panel 30 is irradiated with use of a directional light source 42. For the rest, the third exemplary embodiment has a same configuration as that of the first exemplary embodiment.

The directional light source 42 may be configured by, for example, providing an element for controlling a light beam direction, such as a louver, before a position at which light generated by a light emitting device is incident to the effective display region 38. The rest of operation is the same as that in the first exemplary embodiment, and therefore redundant description is omitted. According to such a configuration, the light to be incident to the effective display region 38 is directional, so that a display image in the effective display region 38 cannot be observed from a direction outside the specific viewing angle range, and therefore an effect equivalent to that in the first exemplary embodiment can be achieved.

Fourth Exemplary Embodiment

Figure 10:
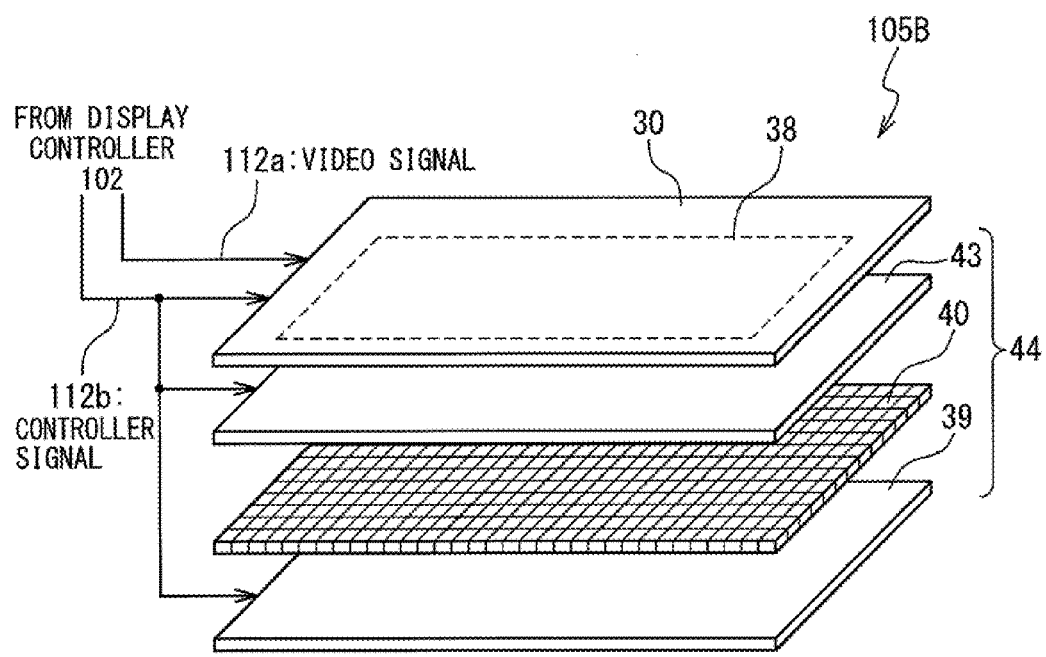
FIG. 10 is a perspective view illustrating a configuration of a liquid crystal display section of a liquid crystal display device in a fourth exemplary embodiment.

FIG. 10 is a perspective view illustrating the configuration of a liquid crystal display section 105B of a liquid crystal display device in a fourth exemplary embodiment. A difference between the liquid crystal display section 105B of the fourth exemplary embodiment and the liquid crystal display section 105 of the first exemplary embodiment is that in the liquid crystal display section 105B, the optical louver 40 and a light transmitting/scattering element 43 are provided between a backlight 39 and the effective display region 38 of the liquid crystal display panel 30. The rest of the configuration of the liquid crystal display device of the fourth exemplary embodiment is same as that of the first exemplary embodiment. In this exemplary embodiment, the backlight 39, optical louver 40, and light transmitting/scattering element 43 have a function of controlling the viewing angle of the liquid crystal display panel 30. Therefore, the backlight 39, the optical louver 40, and the light transmitting/scattering element 43 may be collectively referred to as the viewing angle control section 44.

Figure 11:
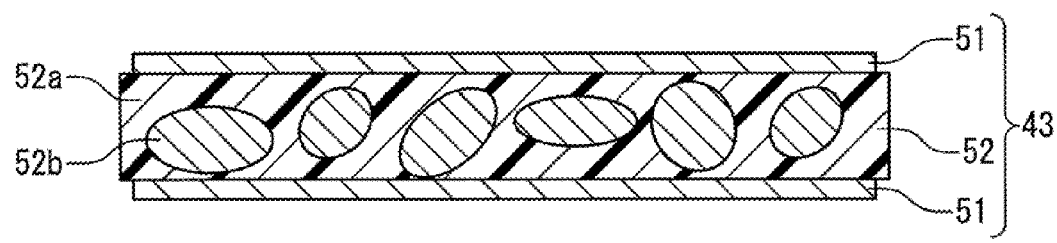
FIG. 11 is a cross-sectional view illustrating a configuration of a light transmitting/scattering element in the fourth exemplary embodiment.

In the viewing angle control section 44, light emitted from the backlight 39 is provided with directionality upon passing through the optical louver 40, and then incident to the light transmitting/scattering element 43. The light transmitting/scattering element 43 is configured to switch between a transparent state not scattering the light and a scattering state scattering the light according to an applied voltage supplied thereto. In one exemplary embodiment, as illustrated in FIG. 11, the light transmitting/scattering element 43 includes a pair of electrodes 51, and a PDLC layer 52 sandwiched between the electrodes 51. The PDLC layer 52 includes a polymer/liquid crystal composite film in which liquid crystal molecules 52*b* are dispersed in a polymer matrix 52*a*. The PDLC layer 52 is formed by, for example, curing a mixture of light curable resin and liquid crystal material with light exposure.

The light transmitting/scattering element 43 having such a configuration controls the orientation state of the liquid crystal molecules 52*b* in the PDLC layer 52 by applying a voltage between the electrodes 51, and can thereby switch between the transparent state not scattering light and the scattering state scattering light. The light transmitting/scattering element 43 scatters light incident from the optical louver 40 or transmits the light without scattering, to emit the light to the liquid crystal display panel 30.

It should be noted that, other polymer/liquid crystal composite films may be used instead of the PDLC layer 52. For example, various types of polymer/liquid crystal composite films are applicable, such as a polymer/liquid crystal composite film in which polymer fibers and/or polymer beads are embedded in a liquid crystal layer, a polymer/liquid crystal composite film in which capsulated liquid droplets are embedded in a polymer layer, and a polymer/liquid crystal composite film in which liquid crystal are immersed in a polymer matrix.

In the following, a description is given of the fact that the light scattering or transmission by the light transmitting/scattering element 43 can control the viewing angle of the liquid crystal display panel 30, i.e., the scattering angle of light emitted from the effective display region 38. In a case of providing a wide viewing angle display (i.e., in the case of increasing the viewing angle of the liquid crystal display panel 30), the PDLC layer 52 is not applied with a voltage. This places the PDLC layer 52 into a state where the liquid molecules 52*b* are randomly dispersed in the polymer matrix 52*a*, and therefore the incident light is scattered. This allows the light to be incident to the effective display region 38 from random directions, and consequently the light is emitted from the effective display region 38 in random directions. Accordingly, the viewing angle of the liquid crystal display panel 30 is increased. In the case of providing a narrow viewing angle display (i.e., in the case of decreasing the viewing angle of the effective display region 38), on the other hand, the PDLC layer 52 is applied with a predetermined voltage. This causes the liquid crystal molecules 52*b* dispersed in the polymer matrix 52*a* to be oriented, and places the PDLC layer 52 into the transparent state. That is, the light transmitting/scattering element 43 is adapted to directly transmit the incident light.

As thus described, the liquid crystal display device of the fourth exemplary embodiment can switch between a narrow viewing angle display and a wide viewing angle display. Accordingly, in the case where providing a secret display of the secret image S, for example, the viewing angle control section 44 is set to provide the narrow viewing angle display, thereby allowing preventing the secret display from leaking. On the other hand, in the case of not requiring the secret display, the viewing angle control section 44 is set to provide the wide viewing angle display, thereby providing an easy-to-view display.

Figure 12A:
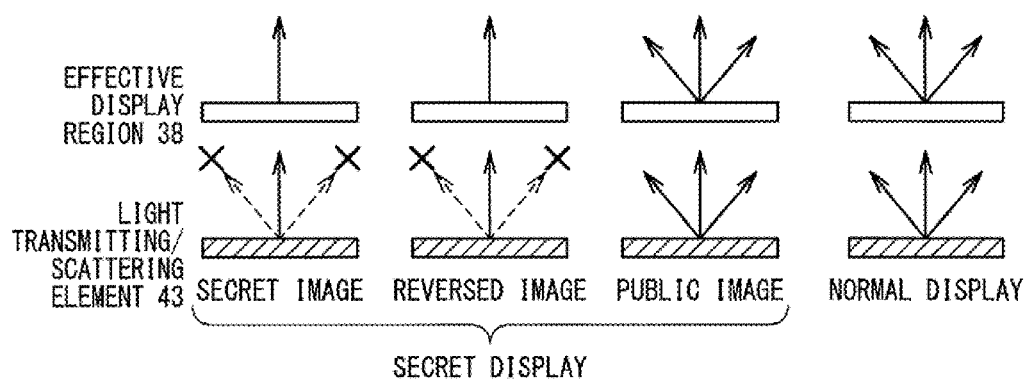
FIG. 12A is a diagram illustrating an example of the operation of the liquid crystal display device in the fourth exemplary embodiment.

FIG. 12A illustrates an example of the operation in switching between the narrow viewing angle display and the wide viewing angle display. In the operation illustrated in FIG. 12A, in the case where the liquid crystal display device of the present exemplary embodiment is set into a secret display mode for providing the secret display, the liquid crystal display device is switched to the narrow viewing angle display to display the secret image or the reversed image, whereas the public image is displayed with the liquid crystal display device being switched to the wide viewing angle display. This prevents the secret image from leaking to a person not wearing the shutter glasses 104, and also keeps ease-of-view of the public image. On the other hand, when the liquid crystal display device of the present exemplary embodiment is set into a normal display mode not displaying the secret image, the liquid crystal display device is switched to the wide viewing angle display. This keeps ease-of-view of a normal image that is displayed when the normal display mode is set.

Figure 12B:
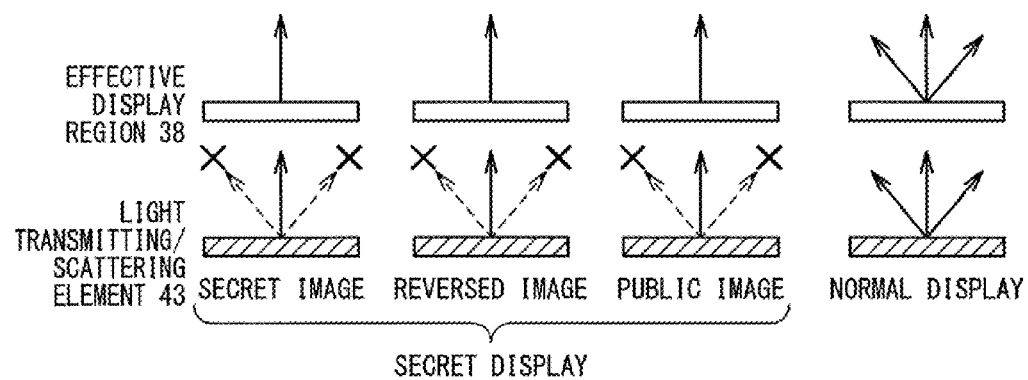
FIG. 12B is a diagram illustrating another example of the operation of the liquid crystal display device in the fourth exemplary embodiment.
Figure 13:
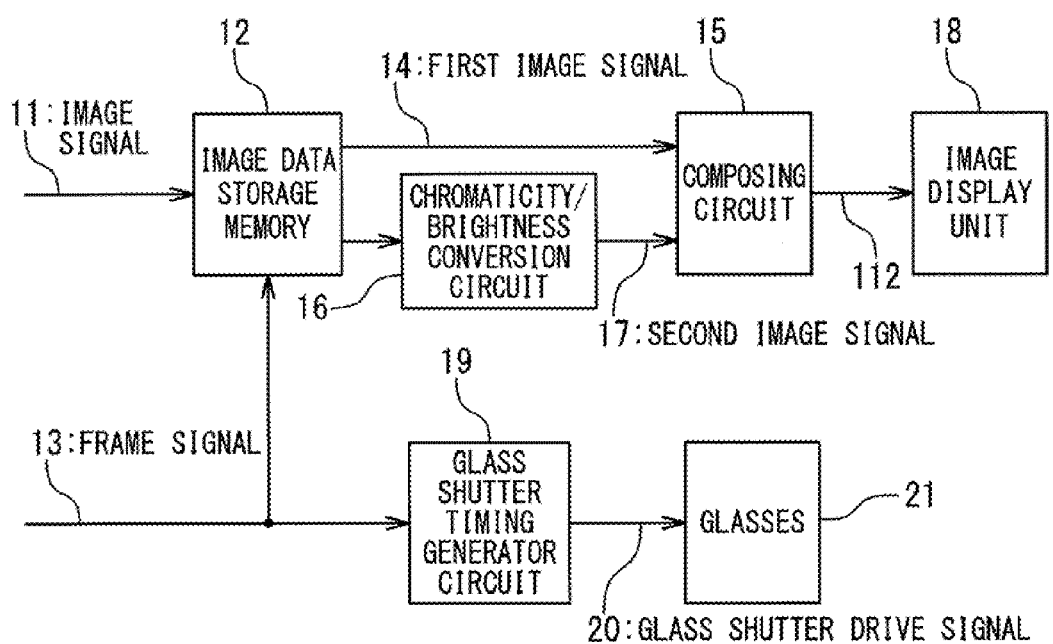
FIG. 13 is a block diagram illustrating a conventional display device.

On the other hand, FIG. 12B illustrates another example of the operation of the liquid crystal display device in the present exemplary embodiment. In the operation illustrated in FIG. 12B, when the liquid crystal display device of the present exemplary embodiment is set into the secret display mode for providing the secret display, the liquid crystal display device is switched to the narrow viewing angle display. In this case, all of the secret image, the reversed image, and the public image are displayed with the narrow viewing angle display. On the other hand, when the liquid crystal display device of the present exemplary embodiment is set into the normal display mode, the liquid crystal display device is set to the wide viewing angle display. Such operation is appropriate, particularly in a case where the viewing angle control section 44 does not respond so quickly. In the operation illustrated in FIG. 12B, the switching between the narrow viewing angle display and the wide viewing angle display is not performed as long as an operation mode of the liquid crystal display device is fixed, and therefore the viewing angle control section 44 is not required to quickly respond.

The rest of the operation of the liquid crystal display device in the fourth exemplary embodiment is same as that in the first exemplary embodiment, and therefore redundant description is omitted.

According to such operation, the light incident to the effective display region 38 is given the directionality at least during the display of the secret image and the reversed image in the secret display, and therefore the viewing angle of the liquid crystal display panel 30 is narrowed. This prevents the secret image leakage caused by the viewing angle dependency of the gamma characteristics. On the other hand, the viewing angle of the liquid crystal display panel 30 is widened in the public image display, or in the normal display, and therefore there is obtained an effect that ease-of-view of the display of the public image and/or the normal image is kept.

It should be noted that the above-described exemplary embodiments are one of preferred exemplary embodiments of the present invention, and therefore the present invention is not limited to any of the above-described exemplary embodiments. For example, in the above-described exemplary embodiments, each of RGB signals is not particularly described; however, it would be appreciated that applying the procedure described in each of the above-described exemplary embodiments to the each signal component achieves the effect of the present invention even in a color image.

Also, the input images (secret image, reversed image, or public image) are not necessarily color images formed from a multiple-colored image signal, but may be a single-colored image. That is, the configuration described in each of the above-described exemplary embodiments is not necessarily provided for respective colors in parallel.

Also, the above description is given on the basis of the configuration using the shutter glasses 104 to perceive the secret image; however, a shutter mechanism for shielding light in synchronization with a synchronization signal is not limited to the shutter glasses 104. Any configuration is acceptable if a configuration has a shutter provided between the liquid crystal display panel 30 and eyes.

Further, although liquid crystal display devices are described in the above-described exemplary embodiments, the present invention is applicable to a plasma display, or other display devices. There are requirement on a plasma display or other display devices for allowing a secret image to be browsed only by a specific person, and shielding the secret image from the others. The present invention avoids the secret image being displayed in a direction other than that in which the specific person browses the image as much as possible, and therefore applying the present invention to a plasma display or other display devices allows more robust retention of the secret image. As thus described, the present invention may be variously modified.

This application is the National Phase of PCT/JP2007/074460, filed Dec. 19, 2007, which claims priority based on Japanese patent application No. 2006-350245, filed on Dec. 26, 2006, the disclosure of which is incorporated herein in its entirety by reference.

What is claimed is:

1. A display device comprising:
a liquid crystal display panel;
a drive section driving said liquid crystal display panel; and
a light shutter control section controlling a light shutter,
wherein said liquid crystal display panel includes an effective display region,
wherein said drive section is configured to display first, second, and third images on said effective display region of said liquid crystal display panel during a specific period,
wherein said liquid crystal display panel is configured to allow perceiving said first, second, and third images only from a direction in a specific viewing angle range which is narrower than a range in which said effective display region is observable, at least during said specific period,
wherein said light shutter control section controls said light shutter so that said light shutter is placed into a transmitting state allowing transmitting light during a period during which said first image is displayed in said specific period and placed into a shielding state shielding light during a remaining period in said specific period,
wherein said first and second images are generated so that an image generated by adding brightnesses of respective pixels of said first and second images has no correlation to said first image,
wherein said specific viewing angle range is determined based on gamma characteristics of said liquid crystal display panel and so that grayscale level reversal does not occur when said liquid crystal display panel is observed from a direction in said specific viewing angle range, and
wherein only said first image is perceived in a case that said effective display region is observed through said light shutter from a direction in said specific viewing angle range, and only said third image is perceived in a case that said effective display region is observed from the direction in said specific viewing angle range without using the light shutter.

2. The display device according to claim 1, wherein said first and second images are generated so that sums of brightnesses of pixels of said first image and brightnesses of corresponding pixels of said second image are substantially constant over the entire of said first and second images.

3. The display device according to claim 1, further comprising:
an optical louver arranged to cover an effective display region of said liquid crystal display panel.

4. The display device according to claim 1, further comprising:
a directional light source emitting light into said display panel.

5. The display device according to claim 1, wherein a viewing angle of said liquid crystal display panel is controllable.

6. The display method according to claim 1, wherein said third image is a public image different than a sum of said first and second images.

7. A display device comprising:
a display section;
a drive section driving said display section; and
a light shutter control section controlling a light shutter,
wherein said drive section is configured to display first, second and third images on said display section in each frame period, said third image being different from said first and second images,
wherein said display section is configured to allow perceiving first and second images only from a direction in a specific viewing angle range at least during a specific period of each frame period,
wherein said light shutter control section controls said light shutter so that said light shutter is placed into a transmitting state allowing transmitting light during a period during which said first image is displayed in said specific period and placed into a shielding state shielding light during a remaining period in said specific period,
wherein said first and second images are generated so that an image generated by adding brightnesses of respective pixels of said first and second images has no correlation to said first image,
wherein a viewing angle of said display panel is controllable, and
wherein the viewing angle of said liquid crystal display panel is controlled to a first viewing angle when said first and second images are displayed and controlled to a second viewing angle wider than the first viewing angle when said third image is displayed.

8. The display device according to claim 7, wherein said display section includes a liquid crystal display panel.

9. The display method, comprising:
displaying first, second, and third images in a specific period on a liquid crystal display panel configured to allow perceiving an image only in a direction in a specific viewing angle which is narrower than a range in which an effective display region of said liquid crystal display panel is observable; and
controlling a light shutter so that the light shutter is placed into a transmitting state allowing transmitting light during a period during which said first image is displayed in said specific period and placed into a shielding state shielding light during a remaining period in said specific period,
wherein said first, second, and third images are generated so that an image generated by adding brightnesses of respective pixels of said first and second images has no correlation to said first image,
wherein said specific viewing angle range is determined based on gamma characteristics of said liquid crystal display panel and so that grayscale level reversal does not occur when said liquid crystal display panel is observed from a direction in said specific viewing angle range, and
wherein only said first image is perceived in a case that said effective display region is observed through said light shutter from a direction in said specific viewing angle range, and only said third image is perceived in a case that said effective display region is observed from the direction in said specific viewing angle range without using the light shutter.

10. The display method according to claim 9, wherein said third image is a public image different than a sum of said first and second images.

11. A display device, comprising:
a liquid crystal display panel;
a drive section driving said liquid crystal display panel; and
a light shutter control section controlling a light shutter,
wherein said drive section is configured to display first and second images on said liquid crystal display panel during a specific period,
wherein said liquid crystal display panel is configured to allow perceiving first and second images only from a direction in a specific viewing angle range at least during said specific period,
wherein said light shutter control section controls said light shutter so that said light shutter is placed into a transmitting state allowing transmitting light during a period during which said first image is displayed in said specific period and placed into a shielding state shielding light during a remaining period in said specific period,
wherein said first and second images are generated so that an image generated by adding brightnesses of respective pixels of said first and second images has no correlation to said first image,
wherein said specific viewing angle range is determined based on gamma characteristics of said liquid crystal display panel and so that grayscale level reversal does not occur when said liquid crystal display panel is observed from a direction in said specific viewing angle range, and
wherein only said first image is perceived in a case that said effective display region is observed through said light shutter from a direction in said specific viewing angle range, and only said third image is perceived in a case that said effective display region is observed from the direction in said specific viewing angle range without using the light shutter.

12. The display device according to claim 11, wherein said first and second images are generated so that sums of brightnesses of pixels of said first image and brightnesses of corresponding pixels of said second image are substantially constant over the entire of said first and second images.

13. The display device according to claim 11, further comprising:
an optical louver arranged to cover an effective display region of said liquid crystal display panel.

14. The display device according to claim 11, further comprising:
a directional light source emitting light into said display panel.

15. The display device according to claim 11, wherein a viewing angle of said liquid crystal display panel is controllable.

16. The display method according to claim 11, wherein said third image is a public image different than a sum of said first and second images.

* * * * *